United States Patent [19]
Mueller et al.

[11] 3,847,597
[45] Nov. 12, 1974

[54] PROCESS FOR THE COMBINED ELIMINATION AND/OR RECONDITIONING OF CARBURIZING SALT WASTES

[75] Inventors: Wolfgang Mueller; Bernhard Rodewald, both of Mannheim; Lothar Witzke, Bruehl, all of Germany

[73] Assignee: Th. Goldschmidt A.G., Essen, Germany

[22] Filed: Apr. 5, 1973

[21] Appl. No.: 348,045

[30] Foreign Application Priority Data
July 12, 1972 Germany............................ 2234171

[52] U.S. Cl...................... 75/99, 23/304, 148/15.5, 148/20.3, 423/430, 423/554
[51] Int. Cl............................................. C22b 7/00
[58] Field of Search ....... 148/15.0, 15.5, 16.6, 20.3; 23/304; 423/155, 430, 554; 75/99

[56] References Cited
UNITED STATES PATENTS
| | | | |
|---|---|---|---|
| 2,339,943 | 1/1944 | Pierce | 423/430 |
| 2,791,489 | 5/1957 | Rahn et al. | 423/430 |
| 3,384,455 | 5/1968 | Fuchs | 148/16.6 |

FOREIGN PATENTS OR APPLICATIONS
| | | | |
|---|---|---|---|
| 1,621,568 | 12/1971 | Germany | 423/430 |

OTHER PUBLICATIONS
Metals Handbook, ASM, Cleveland, 1964, Vol. 2, Heat--Treating, pp. 57 & 133.
Metals, Handbook, ASM, Cleveland, 1948, p. 284, TA472A3.

*Primary Examiner*—Walter R. Satterfield
*Attorney, Agent, or Firm*—James E. Bryan, Esq.

[57] ABSTRACT

A process for the elimination and/or reconditioning of carburizing salt wastes resulting from the hardening of various steel products, including, nitrite- and nitrate-containing wastes, sometimes containing barium, and cyanide- and cyanate-containing wastes in which the nitrite- and nitrate-containing wastes are melted at a temperature between about 120° and 400°C, the resultant melt is filtered to obtain a reusable liquid nitrite/-nitrate mixture and a solid residue, an excess of the residue is mixed with a solid cyanide- and cyanate-containing waste, if the barium-containing waste is to be eliminated rather than reconditioned, a sulfate of calcium, sodium, iron or mixtures thereof is added to the mixture in an amount equivalent to the barium content, and if it is desired to prevent the formation of nitric oxides, a reducing agent, such as, fine coal, charcoal, etc., is added to the mixture, the mixture is heated to a temperature of at least 150°C for a time sufficient to cause ignition of the mixture, preferably in a thin layer on a moving belt, the ignited product is washed with water and filtered to obtain a reusable barium carbonate residue and a strongly alkaline solution containing alkali carbonate suitable for use in the preliminary clean-up of heavy metal salt-containing industrial waste waters or the neutralization of waste acids, and, if a sulfate has been added, directly discarding the ignited product as a storable refuse.

13 Claims, No Drawings

3,847,597

PROCESS FOR THE COMBINED ELIMINATION AND/OR RECONDITIONING OF CARBURIZING SALT WASTES

The present invention relates to a process for the combined elimination and/or reconditioning of carburizing salt wastes, possibly containing barium, involving nitrite/nitrate-containing wastes, on the one hand, and cyanide/cyanate-containing wastes, on the other hand, by oxidation of the cyanide/cyanate with the nitrite/nitrate.

In the salt hardening of various steel products, deposits are formed in the individual salt baths which have to be removed. On occasion, it is also necessary to remove quantities of salt from the melts so as to re-adjust the salt concentration for the respective intended purpose and application, or so as to activate the melt. These deposits and the skimmed off salt are designated as carburizing salt residues and/or carburizing salt wastes.

These carburizing salt wastes are obtained from various baths.

Thus, the residues of carburizing baths contain alkali cyanides, barium salts, alkali chlorides and alkali carbonates.

Wastes obtained from nitriding baths are particularly high in cyanides and cyanates and also contain soda.

Carburizing salt wastes or residues of hot baths have particularly high contents of alkali nitrate and alkali nitrite, and small amounts of cyanide, barium carbonate and alkali chloride.

Wastes from baths used in the treatment of high-speed steels contain barium chloride and barium carbonate as well as alkali chlorides.

For the purpose of eliminating the afore-mentioned carburizing salt wastes, the following processes, among others, have been used heretofore in the art:

In one of the so-called wet reconditioning treatments with alkalis and iron chlorides, iron cyanides and barium carbonate sludge are obtained. In another wet process, where treatment is effected with aqueous iron-II-sulfate, barium sulfate is obtained in addition to iron cyanide. Both of these processes have the disadvantages of all wet preparations or treatments; namely, that substantial amounts of salt-containing waste water or waste liquor are produced and that it is difficult to carry out the required filtrations. Furthermore, the nitrite- and nitrate-containing salts are not taken into account.

A further process, known in the art, is the dry conversion or reaction of the wastes with iron sulfate to produce a mixture of iron cyanide and alkali sulfates. Disadvantageous in this particular process is the fact that the deposition of cyanide complex compounds is inadequate. Here again, the nitrite/nitrate-containing wastes are not taken into consideration.

In those techniques where these wastes are treated with water at elevated temperatures and under pressure, the barium-containing and nitrite- and nitrate-containing constituents of the wastes, which make up the major portion of these wastes, are likewise not taken into account.

German Auslegeschrift No. 1,621,568 also discloses a process for the detoxication or decontamination of cyanide- and nitrite-containing aqueous solutions in which the oxidation of the cyanide is carried out by the nitrate in these aqueous solutions at a hydrogen ion concentration of pH 3.5 or less in a completely closed apparatus, and the reaction is accelerated by contact catalysis. Since this process is conducted at a pH < 3.5, it must be carried out in closed apparatus because of the hydrocyanic acid being freed and, when catalysts are used, it has the disadvantage that, while it does detoxicate or decontaminate the cyanide- and/or nitrite-containing ingredients or constituents, the recovery of barium-containing or nitrite- and nitrate-containing salts is not possible. Furthermore, a detoxication or decontamination of the barium is not effected.

All of the processes which have been proposed in the art to date lead one to only partial solutions of the problem. In no case is there a destruction or detoxication of all of the harmful substances of the solid carburizing salt wastes.

Furthermore, in an interim solution, being carried out at this time, the carburizing salt wastes are either deposited in welded iron barrels or dumped into the ocean. These solutions are uneconomical and, in the long run, untenable for reasons of environmental protection.

It is the object of the present invention to develop a process which not only effects the detoxication or decontamination of the cyanide component, but also decomposes the cyanate, nitrite and nitrate components present in the carburizing salt residues, and, in addition, transforms or converts the existing barium component into either harmless barium sulfate or into barium carbonate which permits the recovery of barium salts.

This object is obtained, in accordance with the present invention, by a process comprising oxidation of the cyanide/cyanate-containing portion of the carburizing salt wastes with an excess of the nitrite/nitrate-containing portion of the carburizing salt wastes by ignition of the dry mixture at temperatures above about 150°C, and, thereafter, washing the mixture containing barium carbonate with water to wash out the barium carbonate.

In order to prevent the reaction from proceeding too violently, and thereby resulting in undesirably turbulent development of gases, such as, nitric oxides, and in order to improve the economy of the detoxication, it is expedient to first separate a major portion of the nitrite-/nitrate-containing salt, which is primarily contained in the hot bath sludge. This can be successfully achieved by melting down the nitrite-/nitrate-containing residues at temperatures of about 120° to 400°C, preferably 160° to 200°C, separating a main portion of this nitrite-/nitrate-containing melt by filtration, and, thereafter, using the nitrite-/nitrate-containing filtration residue for the oxidation of the cyanide-/cynate-containing constituents of the carburizing salt wastes.

During this filtration, a clear white, re-usable nitrite-/nitrate mixture, consisting of 93 to 97 percent by weight of alkali nitrite and alkali nitrate, 1 to 5 percent by weight of alkali chlorides, 0.5 to 2 percent by weight of alkali carbonates, and less than 0.05 percent by weight of barium carbonate is obtained. This alkali nitrite/alkali nitrate mixture may be reemployed once more as a usable tempering salt in salt hardening processes either directly, or after the addition of salts which may possibly be missing.

The filtration is carried out in known filtering devices, such as candle filters, rotary filters, disc filters, etc., whose filtering surfaces may be made of ceramic plates, sintered metal plates, or graphite plates.

The residue resulting from the filtration contains practically all of the barium carbonate, as well as all of the alkali carbonate and 20 to 30 percent by weight of the original alkali nitrite/alkali nitrate constituent. This residue is then mixed with the cyanide-/cyanate-containing wastes as well as the barium chloride-containing wastes to produce a mixture having an excess of the nitrite-/nitrate-containing portion as compared to the cyanide-/cyanate-containing portion. In order to avoid the formation of nitric oxides from excess nitrate and nitrite, a reducing agent, such as lean fine coal, charcoal, etc., is expediently added in an amount of about 1 to 5 percent by weight.

If it is desired to work toward the elimination, rather than a reconditioning of the barium salt-containing carburized salt residues, a sulfate of calcium, sodium and-/or iron in an amount corresponding to the barium portion or constituent, is added during the same process step. But if a further reprocessing or reconstituting of the barium portion is desired, this addition mixture is not carried out.

The constituents which have been mixed and finely ground in this manner are now ignited in a preheated furnace at temperatures of at least 150°C. Due to the exothermic reaction, the mixture heats up to about 600°C within a few minutes. Since a substantial volume of gas, mainly nitrogen and carbon dioxide, escapes during this reaction within a short period of time, it is advisable to maintain the reaction layer thin and to carry out the reaction continuously for heat-technical reasons, such as is possible for instance in a belt oven. Small amounts of nitric oxide, which could possibly be formed at this time in the waste gas, are catalytically after-burned. The reaction product expands at over 400°C and constitutes a brittle pumice-like mass. In the case of the elimination of the barium as barium sulfate, the mass emerging from the oven can be discarded directly as a storable refuse. In addition to barium sulfate, the mass still contains soda as well as sodium and potassium chlorides.

In the case of the recovery of the barium constituent (in this process step no sulfates have been added), the reaction mass contains barium carbonate. If the latter is washed out with water, the soluble portions or ingredients, such as sodium carbonate, potassium chloride, and sodium chloride, are dissolved out. The barium carbonate sludge is separated by filtration and re-used economically either as technical barium carbonate or, after its reaction with hydrochloric acid, as barium chloride. The wash water resulting from the barium carbonate filtration is a strongly alkaline solution containing alkali carbonate and can therefore be utilized very effectively for the preliminary clean-up of heavy metallic salt-containing industrial waste waters, or for neutralizing waste acids.

The particular advantage of the present process is that the detoxication of all solid substances resulting from salt hardening processes is carried out in a simple, non-dangerous manner, since particularly the cyanide-containing salts have no possibility of forming hydrocyanic acid because there is no contact with water or even with acids, and, in addition thereto, treatment is carried out at all times in alkaline mixtures.

The process proposed by the present invention will be further explained hereinafter on the basis of the following examples, wherein Example 1 is indicative of the reconstituting of the wastes, and Example 2 is indicative of the elimination of the wastes.

EXAMPLE 1

1800 parts by weight of hot bath sludge, having the composition of 13.6% Ba, 17.0% Na, 12.2% K, 0.02% CN, 10.6% $CO_3$, 12.0% Cl, 20.5% $NO_2$, 15.7% $NO_3$, were melted down in a steel crucible. 785 parts by weight of a light yellow, clear, thinly liquid melt were drawn off by vacuum within 10 minutes at 150° to 170°C through a filter candle dipped in ceramic, which melt yielded, after cooling and grinding, a nearly white salt consisting of Na(K)-nitrite and nitrate with 0.016% by weight Ba, 0.36% $CO_3$ and 1.37% by weight Cl.

A finely ground mixture of 200 parts by weight of carburizing bath wastes, containing 36.4% Ba, 19.3% Na, 2.4% CN, 17.1% $CO_3$, and 24.3% Cl; 100 parts by weight of nitriding bath wastes, containing 28.7% Na, 17.7% K, 10.5% CN, 16.8% CNO, and 27.5% $CO_3$; 340 parts by weight of filter residue from the hot bath sludge filtration, containing approximately 45% by weight of Na(K)—$NO_2$ ($NO_3$) in addition to $BaCO_3$, $Na_2(K_2)CO_3$ and Na(K)Cl; and 12 parts by weight lean carbon, was spread on a steel sheet base, in a layer approximately 2 cm thick, and slowly heated in a muffle furnace.

At a temperature of 280°C the mixture ignited and the temperature rose to 550°C in about 2 minutes, at which time the gas escaping was predominantly $N_2$ and $CO_2$ (together totaling at least 98%). 597 parts by weight of reaction product were obtained, which contained < 0.001% NaCN, 0.01% N of CNO, $NO_2$, and $NO_3$ as well as < 0.01% water soluble Ba, in addition to $BaCO_3$, $Na_2CO_3$, KCl and NaCl.

By treating the reaction product with water, the following were obtained after filtration: 220 parts by weight of $BaCO_3$ in 235 parts by weight of dry filter sludge and an aqueous solution containing $K_2CO_3$ and $NaCO_3$, in addition to KCl and NaCl. The free alkali of the $Na_2CO_3$ was equivalent to 235 parts by weight of $Na_2CO_3$.

EXAMPLE 2

120 parts by weight of sodium sulfate was admixed with a mixture of filtered hot bath sludge, nitrating both wastes and carburizing bath wastes as in Example 1. When the mixture was heated in a layer, which was 2 cm thick, on a steel sheet base, the ignition of the reaction mixture took place at 340°C. Within 2 minutes the mixture reached the maximum temperature of 590°C, at which time predominantly nitrogen gas and carbon dioxide gas (together totaling at least 98%) escaped.

717 parts by weight of a porous light grey mass, which contained some $Na_2SO_4$, $(K_2)Na_2CO_3$, Na(K)Cl, < 0.001% CN, 0.005% N from ($NO_2$ + $NO_3$ + CNO) and < 0.001% acid-soluble Ba, in addition to $BaSO_4$, was obtained.

It will be obvious to those skilled in the art that many modifications may be made within the scope of the present invention without departing from the spirit thereof, and the invention includes all such modifications.

What is claimed is:

1. A process for the detoxication and/or reconditioning of wastes produced in the salt carburizing of steel products and which include nitrite and nitrate salts and cyanide and cyanate salts, comprising; mixing a solid fraction of a waste containing cyanide and cyanate salts with a solid fraction of a waste containing nitrite and nitrate salts in a ratio such that the nitrite and nitrate salts are present in excess of the amount necessary to oxidize the cyanide and cyanate salts, and heating said mixture to a temperature above about 150°C for a time sufficient to ignite said mixture.

2. A process in accordance with claim 1 wherein the nitrite- and nitrate-containing waste also contains barium and the ignited product is washed with water and filtered to obtain a liquid fraction and a solid residue.

3. A process in accordance with claim 2 wherein the solid residue is a substantially pure barium carbonate.

4. A process in accordance with claim 2 wherein the liquid fraction is a highly alkaline solution containing calcium carbonate.

5. A process in accordance with claim 2 wherein a sulfate is added to the mixture.

6. A process in accordance with claim 5 wherein the sulfate is a sulfate selected from the group consisting of calcium, sodium and iron sulfides and mixtures thereof.

7. A process in accordance with claim 6 wherein the sulfate is added in an amount corresponding to the amount of the barium constituent.

8. A process in accordance with claim 1 wherein a reducing agent is added to the mixture.

9. A process in accordance with claim 8 wherein the reducing agent is added in an amount between about 1 and 5% by weight.

10. A process in accordance with claim 8 wherein the reducing agent is coal.

11. A process in accordance with claim 8 wherein the reducing agent is charcoal.

12. A process in accordance with claim 1 wherein a waste containing nitrite and nitrate salts is melted and filtered to produce a liquid fraction and a solid residue and the solid residue is mixed with the waste containing cyanide and cyanate salts.

13. A process in accordance with claim 12 wherein the nitrite- and nitrate-containing waste is melted at a temperature between about 120° and 400°C.

* * * * *

UNITED STATES PATENT OFFICE
CERTIFICATE OF CORRECTION

PATENT NO. : 3,847,597
DATED : November 12, 1974
INVENTOR(S) : Wolfgang Mueller; Bernhard Rodewald; Lothar Witzke It is certified that error appears in the above-identified patent and that said Letters Patent are hereby corrected as shown below:

Column 6, line 1, delete "sulfides" and substitute ---sulfates---.

Signed and Sealed this fourth Day of November 1975

[SEAL]

Attest:

RUTH C. MASON
*Attesting Officer*

C. MARSHALL DANN
*Commissioner of Patents and Trademarks*